June 13, 1961  C. S. ASH  2,988,400

DEMOUNTABLE-RIM DIFFERENTIAL DUAL WHEEL CONSTRUCTION

Filed April 21, 1958  8 Sheets-Sheet 4

INVENTOR.
Charles S. Ash.
BY Barthel & Bugbee
ATTORNEYS

United States Patent Office

2,988,400
Patented June 13, 1961

2,988,400
DEMOUNTABLE-RIM DIFFERENTIAL DUAL WHEEL CONSTRUCTION
Charles S. Ash, 2220 Wixom Road, Milford, Mich.
Filed Apr. 21, 1958, Ser. No. 729,649
18 Claims. (Cl. 301—36)

This invention relates to vehicle wheels and, in particular, to dual vehicle wheels where two wheels and their tires and demountable rims are mounted coaxially side by side.

One object of this invention is to provide a differential dual wheel construction wherein the outer and inner wheels of the unit are mounted upon separate coaxial telescoped hubs adapted for relative or differential rotation so that one wheel can rotate more rapidly or more slowly than the other wheel of the pair, thereby eliminating the scuffing and sliding ordinarily occurring because of the greater distance of travel of the outer tire of the pair than the inner tire in traversing a curve, also adapting the dual wheels to the reduced rolling radius of the outer tire on curves as the result of the shift of weight to the outer wheel by the action of centrifugal force, and also adapting the dual wheels to the constant changing of the rolling radius of each dual tire on rough roads or upon modern roads having crowns for drainage purposes.

Another object is to provide a differential dual wheel construction of the foregoing character wherein the outer and inner wheels of each pair of dual wheels are connected to separate brake drums which divide and separately dissipate the frictional heat of braking and which also reduce the bell mouth distortion of the brake drums from thermal expansion, as compared with the bell mouth distortion occurring in single undivided brake drums.

Another object is to provide a differential dual wheel construction as set forth in the object immediately preceding, wherein the brake linings of the brake shoes span the braking surfaces of both brake drums of each pair, thereby providing a differential braking action in response to the thermal expansion of the drums as a result of the frictional heat of braking, consequently causing one drum of a pair upon assuming more than its share of the braking load to expand radially more than the other drum beside it and thereby transfer part of its braking load to that other drum, and vice versa.

Another object is to provide a differential dual wheel construction as set forth in the two objects immediately preceding, wherein the web of at least one of the brake drums is provided with an annular bulge which enables the expansion thereof as a result of the frictional heat of braking without causing distortion of the brake drum.

Another object is to provide a differential dual wheel construction of the foregoing character wherein the coaxial telescoped hubs of the outer and inner wheels of the unit are supported for relative or differential rotation upon bearings which receive lubricant from the chamber containing the anti-friction wheel bearings by which the unit is rotatably mounted upon the axle, the escape of lubricant from the differential hub bearings being prevented by seals disposed at the opposite ends of the outer hub.

Another object is to provide a differential dual wheel construction as set forth in the object immediately preceding wherein any lubricant escaping from the main wheel bearings or the differential hub bearings escapes past the exterior surfaces of the brake drums without entering the brake drums and consequently contaminating the brake linings, the main wheel bearings being provided with a slinger which throws the escaping lubricant against a tapered catcher rotatably connected to one of the wheels, the catcher deflecting the escaped lubricant by centrifugal force through apertures in one of the telescoped hubs into the space between the web of one of the brake drums and one of the wheel webs and thence to the exterior of the brake drums.

Another object is to provide a braked differential dual wheel construction as set forth in the foregoing objects wherein the wheel webs of the dual wheels are tapered in radial section from their respective hubs to their respective rims so as to cause the section modulus to be at a maximum adjacent its hub and to decrease radially outward toward its rim.

Another object is to provide a differential dual wheel construction as set forth in the object immediately preceding, wherein the increased section modulus adjacent the hub of each dual wheel is obtained either by thickening the metal of the wheel web adjacent the hub and tapering the thickness radially outward toward the rim, or by reinforcing a wheel web of substantially constant thickness at a location adjacent its hub, in the latter instance adapting the wheel web to be fabricated or built up of stampings from sheet metal.

Another object is to provide a differential dual wheel construction wherein the demountable rims are secured to their respective wheel webs by means of interchangeable rim-bolting clamps adapted for use upon either the inner or outer wheel rims but engaging different bearing surfaces on the inner and outer rims.

Another object is to provide a differential dual wheel construction of the foregoing character wherein the rim of each outer and inner wheel is connected to the respective wheel hub by lugs projecting inward from an adapter ring secured to the rim, the lugs being bolted to the wheel webs without the use of clamps which ordinarily cause distortion of the rim, thereby providing a lighter yet stronger wheel which runs true and can be accurately balanced, and at the same time reduces the tire wear resulting from rims which have been distorted by the clamps securing them to their wheel webs.

Another object is to provide a differential dual wheel construction of the foregoing character which is adaptable either to tube tires or to tubeless tires.

Another object is to provide a differential dual wheel construction of the foregoing character wherein either or both of the outer and inner wheels is formed in a shape especially well adapted for production as a casting or castings, with spokes cast integral with the webs of the wheels, and preferably with reinforcing ribs cast integral with the spokes to strengthen their construction, the inner wheel optionally having at the outer ends of the spokes bridge members integral with and forming axial extensions of the spokes for direct bolting to the inner brake drum.

Another object is to provide a differential dual wheel construction of the foregoing character wherein either or both of the outer and inner wheels is made up of fabricated stamped metal parts united to their respective hubs either by bolting or welding, the approximately cylindrical structure connecting the inner wheel to the inner brake drum being either separate and bolted to the inner wheel or integral with one of the stampings of the inner wheel.

Other objects and advantages of the invention will become apparent during the course of the following description of the accompanying drawings, wherein:

FIGURE 5 is a longitudinal radial section through a differential dual wheel unit, according to another form of the invention also employing tubeless tires but having external reinforcement of the wheel webs adjacent their respective hubs;

FIGURE 6 is a fragmentary front elevation of the bolted connection of a lug of the rim adapter ring to the wheel rib, looking in the direction 6—6 in FIGURE 5;

FIGURE 7 is a fragmentary longitudinal radial section through a modified tube tire rim providing a bolt-on connection between the radial lugs of a rim and the wheel web of FIGURES 4 and 5;

Figures 1, 2:
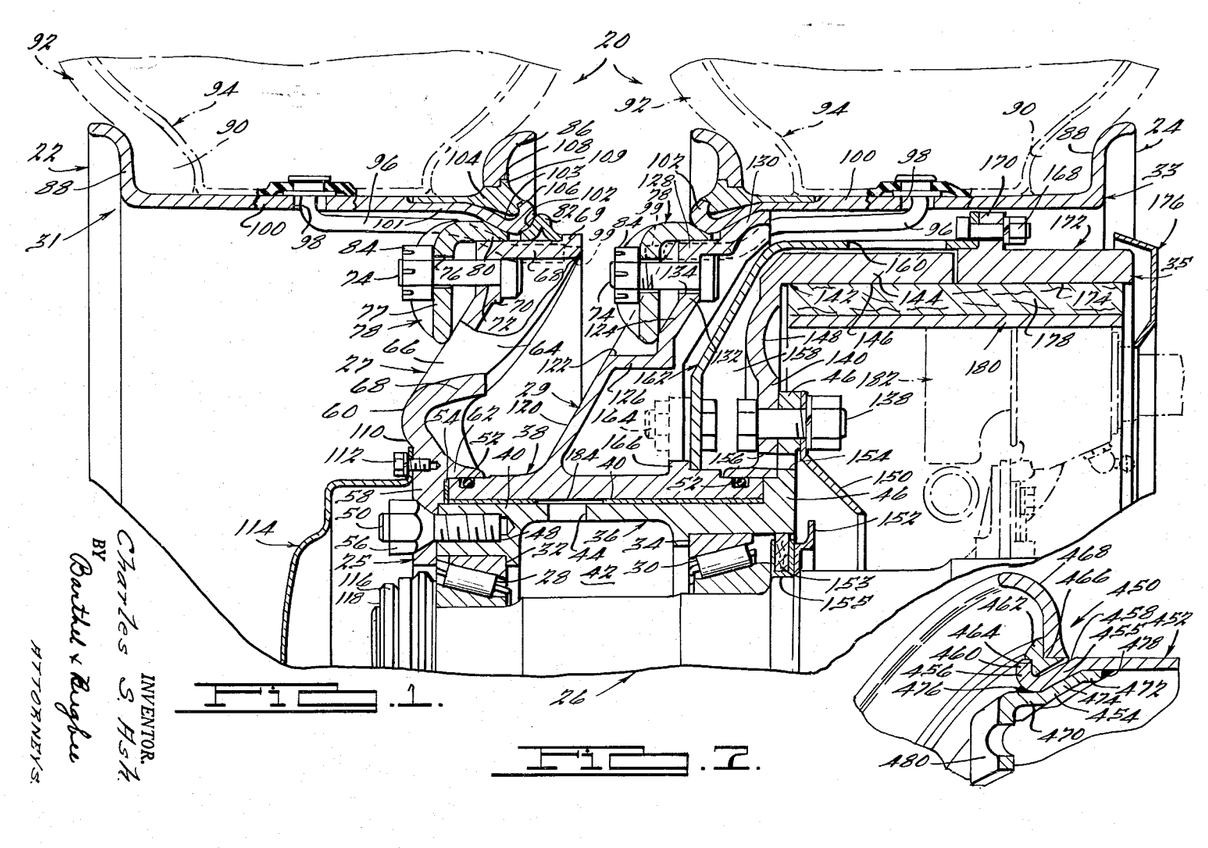
FIGURE 1 is a longitudinal radial section through a differential dual wheel unit, according to one form of the invention, employing tube tires and cast tapered wheel webs, with the lower portion of the wheel omitted to conserve space.
FIGURE 2 is a longitudinal radial section through a differential dual wheel unit, according to another form of the invention, employing tube tires and fabricated stamped wheel webs, with the lower portion of the wheel also omitted to conserve space.
Figure 1:
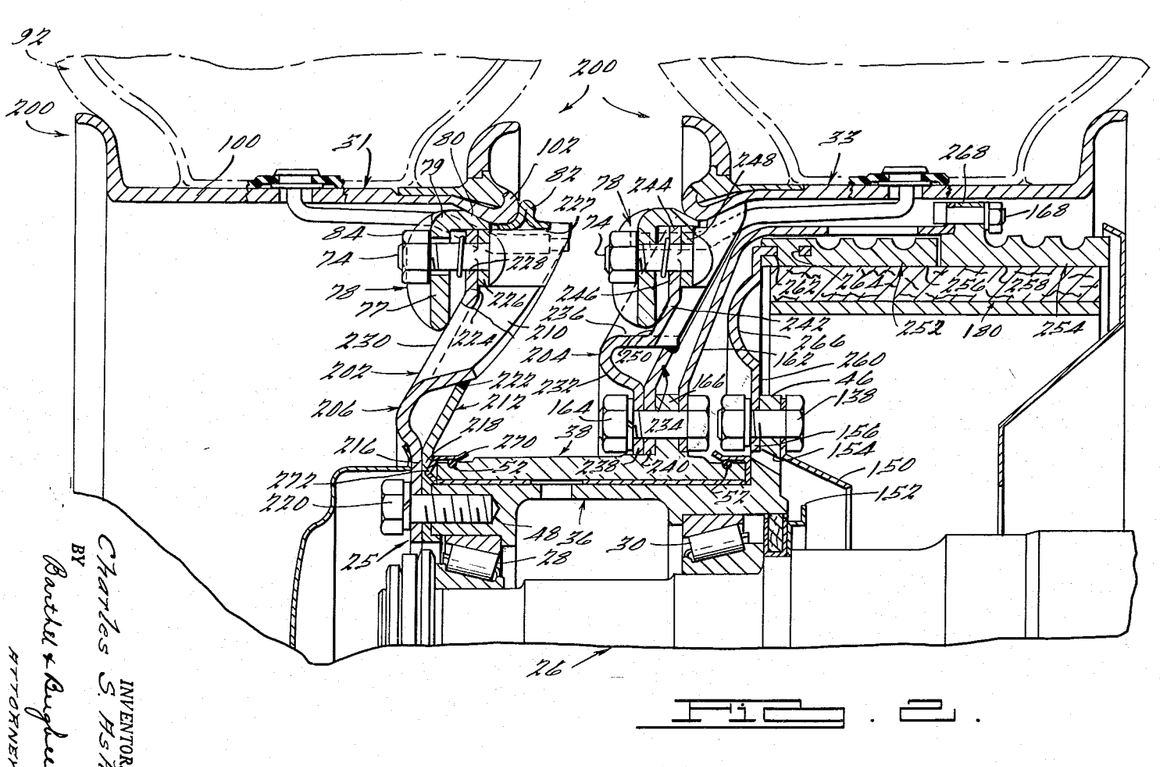

Referring to the drawings in detail, FIGURE 1 shows the upper half of a braked differential dual wheel unit, generally designated 20, as including outer and inner braked wheel assemblies 22 and 24 consisting respectively of a hub assembly 25 rotatably mounted upon an axle 26, outer and inner wheels 27 and 29, and outer and inner rim assemblies 31 and 33. The wheel assemblies 22 and 24 are braked by a brake drum assembly 35 connected thereto. The hub assembly 25 is rotatably supported on the axle 26 by anti-friction wheel bearing assemblies 28 and 30 mounted upon the axle 26 in axially-spaced relationship to one another and their outer races are mounted in annual seats or rabbets 32 and 34 in the thickened opposite ends of the inner tubular wheel hub 36.

Mounted for differential rotation relatively to the inner hub 36 is an outer tubular wheel hub 38 spaced radially therefrom in telescoped relationship therewith by sleeve bearings 40 of bronze of other suitable bearing material. A suitable lubricant supplied to an annular chamber 42 surrounding the axle 26 between the main wheel bearings 28 and 30 reaches each sleeve bearing 40 through peripherally-spaced holes 44 in the central portion of each inner hub 36. The latter at its inner end is provided with a radial bolt-on flange 46 also serving as a retaining abutment for the rearward end of the outer wheel hub 38. The outer end of the inner hub 36 is provided with threaded holes 48 disposed at circumferentially-spaced locations therearound with their axes disposed parallel to the axis of the axle 26 and having threaded studs 50 threaded therein. The outer hub 38 near its opposite ends is grooved to receive so-called O-rings 52 for lubricant sealing purposes. The outer end of the outer hub 38 is provided with a washer 54.

Secured to the inner hub 36 as by the tapered nuts 56 upon the studs 50 is the central portion 58 of the outer wheel web 60 of the outer wheel 27 (FIGURE 1). The central portion 58 is thickened and provided with an annular rabbet 62 overlapping the forward end of the outer hub 38 and the O-ring 52 seated therein. The wheel web 60 is preferably formed of cast metal which is tapered outwardly toward its periphery so as to provide an increased section modulus at the central portion 58 for increased strength and a decreased section modulus in a direction radially outward from the central portion 58 to its periphery. The wheel web 60 is provided near its periphery with arcuate indentations or cutaway portions 64 at evenly-spaced intervals around the circumference thereof in a manner similar to that shown in FIGURE 3 in order to form spokes 66 having bent outer ends 68.

Each spoke end 68 extends substantially parallel to the axis of the inner hub 36, terminates in an angled abutment flange 69, and is connected to the inner portion of its spoke 66 by an annular radial portion 70 which is provided with holes 72 receiving the shanks of rim clamping bolts 74. The latter pass through enlarged holes 76 in the radial portions 77 of rim clamps 78 of angle cross-section (FIGURE 1), the axial portions 79 (FIGURE 2) of which have wedging inner edges 80 of tapered cross-section resting upon the bent spoke ends 68 of the wheel web 60. Also resting upon the bent spoke ends 68 of the whel web 60 is an abutment ring 82 of approximately inverted V-shaped cross-section with annular concave opposite sides and engaging the abutment flanges 69. Nuts 84 are threaded upon the bolts 74 to secure the clamps 78 to the wheel webs 60, the lower ends of the clamps 78 engaging the outer surfaces of the spokes 68.

Mounted upon the peripheral portion 64 of the outer wheel web 60 is the demountable outer tire rim assembly 31 having the usual rounded flange 88 on one edge and the removable flange ring 86 at the opposite edge for the engagement of the beads 90 of a conventional inner tube tire 92 having an inner tube 94 mounted therein and provided with an inflation stem 96 of bent construction adapted to pass loosely through a radial hole 98 in the bottom 100 of the rim 31 and having an externally-threaded end 99. The inner edge of the bottom 100 of the rim assembly 31 has an outwardly-projecting flange 101 and is rounded annularly as at 102 to extend inwardly into the groove-like depression between the abutment ring 82 and the wedging portion 80 of each clamp 78. The bottom 100 of each rim assembly 31 and 33 is recessed near the rounded edge 102 as at 103 to receive an annular removable split locking band 104 which in turn is rabbeted at 106 to receive the inner flange 86 of the rim assembly 31. The flange 86 and band 104 are removed by prying the latter out of the annular recess 103 in the annularly-rounded inner edge portion 102 in order to apply or remove a tire 92. The removable flange ring 86 is rabbeted at 108 to receive the upper rib 109 of the locking band 104 in interfitting relationship. From FIGURE 1 it will be seen that the radial portion of each clamp 78 is separated from the radial peripheral portion 70 of the wheel web 60 in order to provide space for drawing the latter toward the former, the wheel web 60 being inclined relatively to the axis of rotation thereof in order to impart an outward clamping and wedging action of each clamp 78 against the rounded portion 102 of the rim assembly 31 as the nuts 84 are tightened upon their respective bolts 74. The central portion 58 of the outer wheel web 60 is drilled and threaded at circumferentially-spaced intervals, as at 110, to receive cap screws 112 by which a flanged cup-shaped hub cap 114 is secured thereto in covering relationship to the nuts 116 threaded upon the threaded end 118 of the axle 26, in a manner also shown in FIGURE 3.

Figure 3:
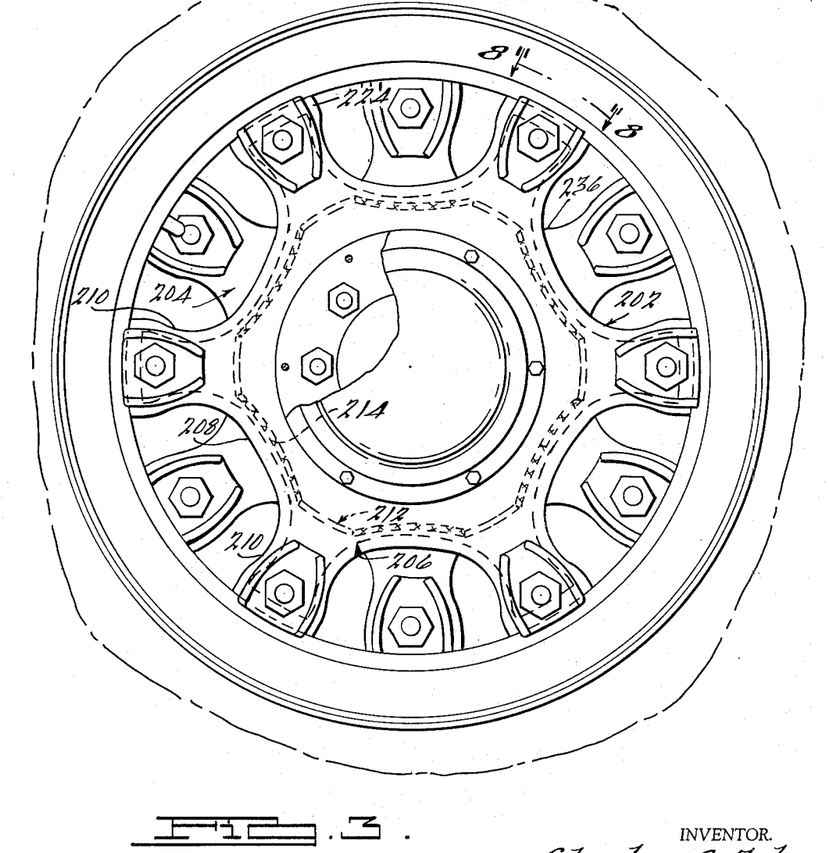
FIGURE 3 is a front elevation upon a reduced scale of the wheel unit shown in FIGURE 2, with the hub cap partly broken away and with the spokes of the inner wheel rotated out of alignment with the spokes of the outer wheel, in order to disclose the construction more clearly.

Integral with and inclined rearwardly from the outer hub 38 is the wheel web 120 of the inner wheel 29 which as in the case of the outer wheel 27, has arcuate indentations or cutaway portions 122 at evenly-spaced intervals around the circumference in a manner similar to that shown in FIGURE 3 and providing spokes 124 interconnected by arcuate integral ribs 126. The spokes 124 have axially-bent ends 128 provided with upwardly-inclined wedging portions 130 and with radial portions 132 containing bolt holes 134 parallel to the axis of the outer hub 38. The bolt holes 134 receive clamping bolts 74 identical with the outer clamping bolts 74 previously mentioned, and also identical and interchangeable clamps 78 described above. The clamps 78, as before, engage the rounded edge portion 102 of the bottom 100 of the inner demountable tire rim assembly 33 identical in construction and interchangeable with the outer rim assembly 31 but with its parts facing in a reverse direction. Accordingly, the component parts of the inner rim assembly 33 are designated with the same reference numerals as the outer rim assembly 31 and receive the beads 90 of a similar inner tube tire 92 containing a similar inner tube 94 with a similar inflation stem 96 of bent construction similarly passing through a radial hole 98 in the rim bottom 100.

The radial bolt-on flange 46 of the inner hub 36 is drilled at circumferentially-spaced intervals to receive bolts 138 by which the correspondingly-drilled centrally-flanged web 140 of an outer brake drum, generally designated 142 of the brake drum assembly 35 is secured to flange 46, with its central flange overlapping the O-ring 52 in sealing engagement. The brake drum 142 has a cylindrical peripheral drum wall 144 with a cylindrical internal braking surface 146 and the web 140, which is of generally radial direction, has an annular expansion bulge 148 therein extending substantially from the outer cylindrical drum wall 144 to the bolt-on flange 46 for permitting radial expansion of the brake drum wall 144 in response to the frictional heating thereof by braking action without causing harmful deformation thereof, as might occur with a purely radial web 140 without the annular bulge 148.

Also secured to the bolt-on flange 46 is a centrally-apertured frusto-conical lubricant deflector 150 which deflects lubricant from a stationary radial slinger 152 pressed onto the axle 26 adjacent a fibrous washer 153 in a grooved holder 155 through aligned holes 154 and 156 in the flange 46 and web 140 respectively into the space 158 immediately to the left of the brake drum 140, whence it escapes around the periphery of the drum wall 144 through apertures 160 in a hollow cup-shaped shell 162. The central portion of the shell 162 is drilled at circumferentially-spaced intervals to receive bolts 164. The bolts 164 also pass through and are secured to a correspondingly-drilled radial bolt-on flange 166 integral with the outer hub 38.

The outer edge of the shell 162 is flanged and drilled at circumferentially-spaced intervals to receive correspondingly-spaced bolts 168 which pass through the similarly-drilled radial flange 170 projecting radially from the outer surface of an inner brake drum, generally designated 172, of the brake drum assembly 35, the drum 172 having an internal cylindrical braking surface 174. Thus, the shell 162 serves as the web for the inner brake drum 172 and similarly permits radial expansion thereof in response to the frictional heat of braking. A closure disc 176 closes the open inner end of the inner brake drum 172 in order to exclude dirt, water and other foreign matter, and is centrally apertured for the passage of the axle 26.

The cylindrical internal braking surfaces 146 and 174 of the outer and inner brake drums 142 and 172 are engaged by the brake linings 178 of brake shoes 180 (only one of which is shown) actuated by conventional braking mechanism, generally designated 182, contained in the space inside the brake drums 142 and 172 and the closure disc 176. The braking mechanism 182 is conventional and is outside the scope of the present invention, any convenient brake-operating mechanism being contemplated for moving the brake shoes 180 and their brake linings 178 into and out of frictional braking engagement with the cylindrical internal braking surfaces 146 and 174 of the brake drums 142 and 172. The braking surfaces 146 and 174 are preferably of the same radius of curvature and coaxial with one another, and are preferably spanned by a common brake lining 178 and brake shoe 180, which thereby substantially simultaneously engages both braking surfaces 146 and 174.

The inner hub 36 is preferably made of hardened steel or with hardened surfaces or with hard chrome-plated surfaces whereas the outer hub 38 is preferably made of softer material, not hardened, so that its opposite ends will have suitable bearing engagement with the flange 46 of the inner hub 36 and with the washer 54, which is of hardened steel or has hardened surfaces for the same reason. The two bearing bushings 40 are of different widths and are separated from one another by an annular lubricant chamber or passageway 184 supplied with lubricant through the holes 44 in the inner hub 36.

The modified braked differential dual wheel unit, generally designated 200, shown in FIGURES 2 and 3 is generally similar to the differential dual wheel unit 20 of FIGURE 1, particularly as regards its outer and inner rim assemblies 31 and 33, together with the clamps 78 and clamping bolts 74 therefor, as well as the abutment ring 82, and has a hub assembly 25 with similar inner and outer hubs 36 and 38 similarly supported for rotation upon anti-friction bearing assemblies 28 and 30 relatively to a similar axle 26. Consequently, corresponding parts in FIGURES 2 and 3 are designated with the same reference numerals as those in FIGURE 1.

The differential dual wheel unit 200 differs from the unit 20 principally in the construction of the outer and inner wheels 202 and 204 respectively, which are fabricated or built up from stamped sheet metal components or stampings. The outer wheel 202 is composed of an outer web 206 which is provided with arcuate cutaway portions 208 spaced at equidistant intervals around the periphery thereof to form approximately radial spokes 210, and a reinforcement member 212 disposed rearwardly thereof in spaced relationship therewith and provided with similar arcuate indentations 214. The outer and inner web 206 and the reinforcement member 212 are centrally apertured for the passage of the axle 26 and the central portions 216 and 218 thereof are drilled in alignment at intervals therearound to receive bolts 220 which, like the studs 50 of FIGURE 1, are threaded into the threaded axial holes 48 in the forward end of the inner hub 36. The peripheral portions of the reinforcement member 212 are welded or otherwise firmly secured to the outer wheel web 206 as at 222 to provide a strong construction having an increased sectional modulus near the central portion thereof because of the double thickness of sheet metal, the close approach thereof to one another at the outer ends of the spokes 210 decreasing the section modulus in a manner avoiding the more costly cast tapered construction of the wheel web 60 of FIGURE 1.

Figure 8:
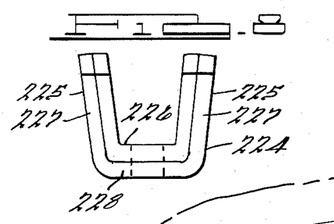
FIGURE 8 is an end view of one of the wheel spokes, together with its reinforcing member, looking in the direction of the arrows 8—8 in FIGURE 3, and omitting the clamps and clampng bolts.

As will be seen from FIGURE 8, the outer ends 224 of the spokes 210 are of approximately U-shaped cross-section with opposite side walls 225 and a central connecting wall 228, with a U-shaped reinforcement plate 226 welded to the rearward side of each connecting wall 228, both being drilled to receive the clamping bolts 74. The upper edges of the side walls 225 contain recesses 227 for the split ring 82. The spokes 210 have their connecting wall 228 disposed radially (FIGURE 2), whereas the intermediate portions 230 beneath the radial portions 228 are slightly inclined. The axial portions 79 of the clamps 78 engage the outer edges of the portions 226 and 228 (FIGURE 2) to slide therealong, whereas the radial portions 77 as before, engage the inclined surfaces 230.

The inner wheel 204 is of similar construction to the outer wheel 202 and is similarly formed from a stamped inner web 232 and a reinforcement member 234 corresponding respectively to the outer web 206 and reinforcement member 212 and similarly secured thereto by welding at the similarly-formed arcuate indentations 236. The inner wheel 204, because of the securing of its inner flanges 238 and 240 by the bolts 164 to the radial flange 166 of the outer hub 38, has a larger central aperture therein than the outer wheel 206, but the constructions are otherwise similar, with similarly-formed spokes 242 of approximately U-shaped cross-section with ends 244 likewise of approximately U-shaped cross-section with their radial connecting portions 246 reinforced by reinforcement plates 248 similar to the reinforcement plates 226 and similarly welded in place. Clamping bolts 74 and clamps 78 similarly engaging the outer edges of the portions 244 and 248 and the inclined surfaces 250 exert a similar welding action upon the inner tire rim assembly 33 (FIGURE 2) but without the use of the abutment ring 82.

The outer and inner brake drums 252 and 254 are of cylindrical shape with coaxial internal cylindrical surfaces 256 and 258 of the same radius of curvature, the outer brake drum 252 being cast integral with or otherwise secured to a generally radial web 260 in the form of a sheet metal stamping having a peripheral flange 262 with circumferentially-spaced holes 264 through which the cast metal of the brake drum 252 flows during the casting process. An intermediate annular bulge 266 provides for radial expansion of the brake drum 252 in response to frictional heat generated by the braking action. The inner brake drum 254 is flanged as at 268 and drilled therein for the reception of the bolts 168 by which it is secured to the cup-shaped supporting shell 162 in the same manner as the similarly designated parts in FIGURE 1. The stamped web 260 is secured to the radial flange 46 of the inner hub 36 by similar bolts 138 to those shown in FIGURE 1, and similar holes 154 and 156 are provided for the escape of lubricant after its deflection by the lubricant deflector 150 when thrown outward by the slinger 152.

Since the built-up or fabricated wheels 202 and 204 are not centrally flanged, the sealing O-rings 52 in the grooved outer hub 38 are engaged by cupped sealing caps 270 of angle cross-section extending around the opposite ends of the hub and indented as at 272 to prevent rotation thereof.

Figure 4:
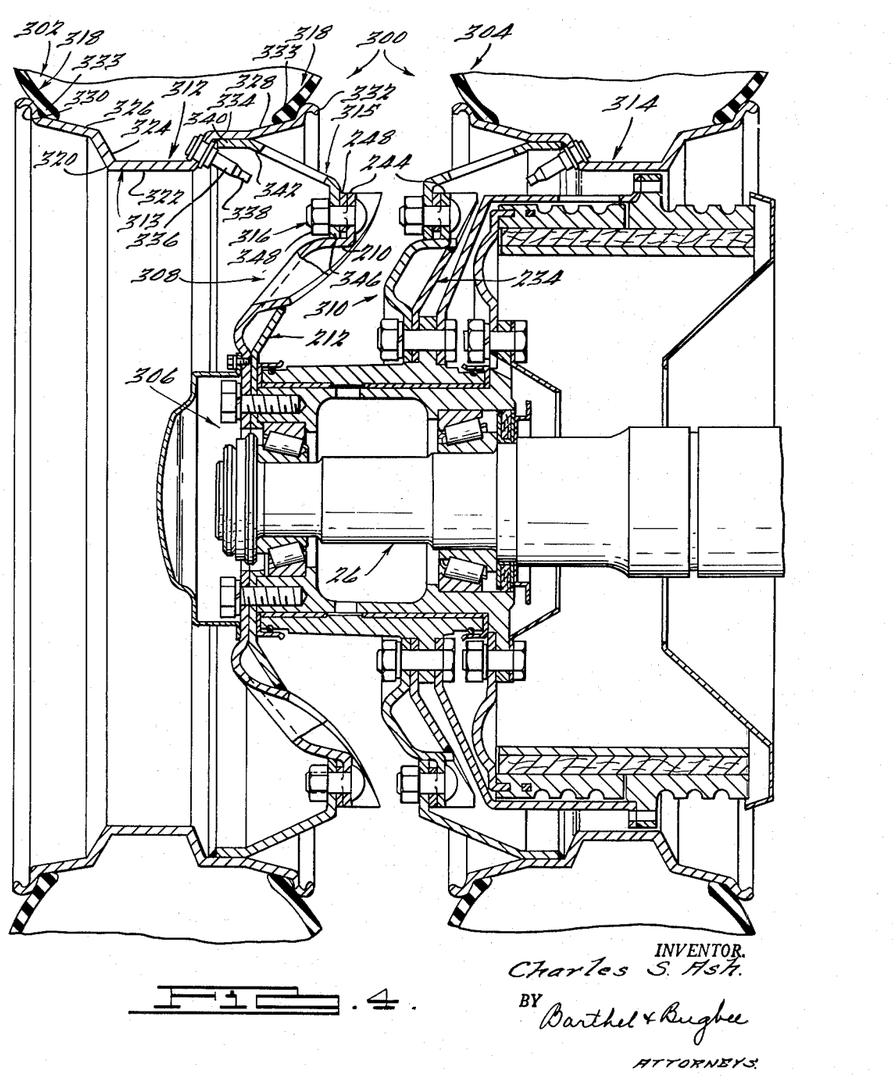
FIGURE 4 is a longitudinal radial section through a complete differential dual wheel unit, according to still another form of the invention, employing tubeless tires, the rims of which are secured to their respective wheel webs through adapter rings and bolted lugs with the wheel webs having internal reinforcements adjacent their respective hubs.

The further modified differential dual wheel unit, generally designated 300, shown in FIGURE 4, has outer and inner wheel assemblies 302 and 304 respectively consisting generally, as before, of a hub assembly 306 mounted on the axle 26, outer and inner wheels 308 and 310 secured to the hub assembly 306, and outer and inner rim assemblies 312 and 314 respectively secured to the outer and inner wheels 308 and 310. In the dual differential wheel unit 300, the hub assembly 306 and the outer and inner wheels 308 and 310 remain the same as those of FIGURE 2, with the exception of the connections of the spoke ends of the outer and inner wheels 308 and 310 with the outer and inner rim assemblies 312 and 314 and with the further exception that the rim assemblies 312 and 314 are of the so-called tubeless tire type rather than of the tube tire type. Accordingly, similar and corresponding parts are designated with the same reference numerals.

The wheels 308 and 310 resemble the wheels 202 and 204 of FIGURES 2 and 3 in their web and hub attachment construction as shown in the lower half of FIGURE 2, and also employ the fabricated or built-up reinforced construction giving a decreasing section modulus from the hub 38 outward. Since the clamps 78 and clamping bolts 74 of FIGURES 1, 2 and 3 have been superseded by plain bolts 316, the inclined portions 124 of FIGURE 1 and 250 of FIGURE 2 are no longer necessary for operating such clamps, and hence are omitted. The spoke end construction is otherwise identical with the exception of the fact that in FIGURE 4 the reinforcement plates 248 are placed in front of the spoke ends 244 rather than behind them, as in FIGURE 2.

Each of the outer and inner tubeless tire rim assemblies 312 and 314 consists of a tubeless tire rim 313 and a rim adapter ring 315 secured thereto. Each rim 313 is adapted to handle tubeless tires 318 instead of the inner tube tires 92 of FIGURES 1 to 3 inclusive. Each rim 313 has a central channel annular portion 320 with a bottom wall 322 and steeply inclined side walls 324 joined by slightly inclined intermediate walls 326 and 328 to rounded or rolled edge flanges 330 and 332 which are engaged by the beads 333 of the tire 318 in an air-tight sealing engagement. The intermediate wall 328 is joined to its channel side walls 324 by a substantially cylindrical wall portion 334. The outer and inner rim assemblies 312 and 314 are of similar construction and are interchangeable in reversed positions. Each channel portion 320 of each rim assembly 312 or 314 has one of its side walls 324 bored to receive an inflation stem 336 bolted thereto in an airtight sealed engagement and provided with a threaded outer end 338.

Secured as by welding to the inner surface of the cylindrical wall portion 334 of each rim 313 is the axial cylindrical flange 340 of the wheel adapter ring 315. The latter also possesses an intermediate inclined or conical wall portion 342 with an access hole 343 adjacent the inflation stem 336. The wall portion 342 connects the axial cylindrical flange 340 with radially-projecting lugs 346 disposed at circumferentially-spaced intervals therearound and drilled in alignment with the reinforcement plates 248 and spoke ends 244 to receive the coupling bolts 316. The latter are provided with nuts 348 by which the lugs 346 can be tightly bolted against the reinforcements 248 and spoke ends 244 without the need for clamps 78 of FIGURES 1 to 3 inclusive.

The FIGURE 4 construction, by eliminating the clamps 78, eliminates the consequent distortion of the rims which such clamps inevitably bring about, with consequent distortion of the wheel and tire. Such distortion arises as a result of the fact that the clamps 78, when tightened, tend to spread the rim and wheel apart from one another, requiring the use of a heavier metal for the wheel in order to counteract this deformation, thereby requiring more steel or other material in the wheel and raising the cost thereof. Moreover, such distortion or deformation of the rim and wheel by such clamps causes the wheel and tire to run out of round, with consequent uneven wear upon the tire and difficulty of balancing the wheel so that it will run true. The clamps 78 of the present invention, however, have the advantage over prior rim clamps of being interchangeable between the outer and inner rims and wheels, whereas prior clamps for the outer wheels differ from clamps for the inner wheels. The brake drum assembly 35 in FIGURE 4 remains substantially unchanged for the outer and inner wheels from that of FIGURE 2, hence is designated with the same reference numerals.

The still further modified differential dual wheel unit, generally designated 400 of FIGURES 5 and 6, has outer and inner wheel assemblies 402 and 404, consisting generally of a hub assembly 406 mounted on the axle 26, outer and inner wheels 408 and 410 bolted to the hub assembly 406, and outer and inner rim assemblies 412 and 414 bolted to the wheels 408 and 410. The hub assembly 406 remains the same as that of FIGURES 2 and 4, but the rim assemblies 412 and 414 are somewhat changed, and the wheels 408 and 410 are reinforced externally rather than internally as in FIGURES 2 and 4. Each of the rim assemblies 412 and 414 has a rim 313 similar in construction to the rim 313 of FIGURE 4 and adapted to similarly receive a tubeless tire 318, hence the same reference numerals are used for corresponding parts. In the rim assemblies 412 and 414, however, the rim adapter rings 416 are of slightly different construction than the rim adapter rings 315 and are differently connected to the rims 313.

In particular, each rim adapter ring 416 (FIGURES 5 and 6) consists of an axial substantially cylindrical portion 418 which is welded or otherwise secured at 419 to the bottom wall 322 of the rim 313, rather than to the cylindrical wall portion 334 thereof, and a more shallowly inclined intermediate conical portion 420 having an access hole 422 therein adjacent the inflation stem 336. The intermediate conical portion 420, as before, has radial lugs 426 spaced circumferentially therearound and drilled to receive the bolts 316.

The outer and inner wheels 408 and 410 of FIGURE 5 differ from the outer and inner wheels 308 and 310 of FIGURE 4, and also from the outer and inner wheels 202 and 204 of FIGURE 2 by having annular external reinforcement members 428 and 430 respectively located in front of rather than behind the connection portions 432 and 434. The wheel webs 436 and 438 are bolted, as before, to their respective hubs 36 and 38. The wheel web 436 resembles that shown in FIGURE 3 in its general construction and appearance in front elevation, but like the wheels 308 and 310 of FIGURE 4, has spokes 440 formed between spaced similar arcuate cutaway portions 441 (FIGURE 6). The spokes 440 have upstanding radial ends 442 of approximately U-shaped cross-section reinforced by reinforcement plates 444 welded or otherwise secured thereto in front thereof and drilled in alignment with the lugs 426 to receive the bolts 316. The reinforcement member 428 is in the form of a radial ring drilled at suitable circumferential intervals to receive the axial bolts 220 which secure the outer wheel 408 to the inner hub 36. The reinforcement member 428 is welded or otherwise secured as at 446 to the outer wheel web 436 adjacent the flanged connection portion 432. The brake drum assembly 35 is substantially the same as those of FIGURES 2 and 4, hence is designated with the same reference numerals.

The modified rim assembly, generally designated 450, shown in fragmentary cross-section in FIGURE 7 employs a tube tire rim, generally designated 452, suitable for use with the tube tires 92 of FIGURES 1 and 2 and of generally similar construction and employing a rim adapter lug 454 in place of the construction employing the clamps 78 of FIGURES 1 and 2. In particular, the rim 452 has an inwardly-bent rounded edge portion 456 forming an approximately V-shaped annular external recess 458 bounded by a radial flange 460. The recess 458 receives a removable locking ring 462 having a lower annular rabbet 464 engageable with the flange 460 and an upper annular rabbet 466 engaged by the inner edge of the removable demountable rim end wall 468.

The rim adapter lug 454 of FIGURE 7 is composed of annular outer and inner axial cylindrical portions 470 and 472 respectively joined to one another by a conical portion 474, the configuration of these parts being such as to snugly engage the inclined portion 455 and to be secured thereto as by welding at the locations 476 and 478 respectively. Extending radially inward from the outer annular portion 470 are lugs 480 which are drilled, as before, to receive the bolts 316 of FIGURES 4, 5 and 6. Thus, the construction shown in FIGURE 8 employing the modified rim assembly 450 enables the direct bolting of the rim assembly 450 to the wheel without the intermediate use of the clamps 78 and consequently without incurring the resulting rim and wheel deformation and the ensuing tire wear.

In the operation of the invention in its various forms, whether for the inner tube tires of FIGURES 1, 2 and 7 or the tubeless tires of FIGURES 4 and 5, and with or without the clamps 78, during the travel of the vehicle, such as a truck or trailer, the outer and inner wheels and their respective tires are capable of revolving independently of one another as the vehicle rounds corners or curves, or as it traverses rough roads or faces other conditions which tend to cause the outer and inner tires to rotate independently of and relatively to one another. When this occurs, the outer and inner hubs 38 and 36, which are simultaneously revolving together on their anti-friction bearing assemblies 28 and 30, also to some extent rotate or slip relatively to one another on their respective sleeve bearings 40. This action enables the tires to follow their most efficient paths and to yield relatively to one another when necessary, as when the rolling radius of each dual tire changes upon curves, rough roads, or upon the crowns of modern roads. The present invention also provides a wheel construction wherein the rim assembly can be secured to the wheel either by direct bolting and consequent elimination of rim and wheel distortion or deformation, or by clamps which are interchangeable between the outer and inner wheels. Furthermore, the lubricant from the anti-friction bearing assemblies adjacent the axle is expelled during travel by being deflected outside the brake chamber within the brake drums, so that it does not contaminate the brake linings.

As braking of the vehicle is required during transit, the operator actuates the conventional brake-operating mechanism 182 (FIGURE 1) to cause the brake linings 178 of the brake shoes 180 to simultaneously engage the internal braking surfaces 146 and 174 of the brake drums 142 and 172, this braking retardation being transmitted to the outer and inner wheels 60 and 120 respectively through the brake drum web 140 and shell 162 and the inner and outer hubs 36 and 38 to the outer and inner wheels 60 and 120 and thence to the outer and inner rims 31 and 33 and finally to the outer and inner tires 92 mounted thereon (FIGURE 1). A similar transmission of retardation force occurs in the dual differential wheel units 200 of FIGURE 2, 300 of FIGURE 4 and 400 of FIGURE 5.

As the brake drums 142 and 172 heat up under the frictional heat of braking, they are free to expand independently of one another, thereby at least halving the deformation or bell-mouth distortion which occurs in wide single brake drums for both wheels, the annular bulges 148 or 266 in the brake drum web 140 or 260 (FIGURES 1 and 2), or the cup-shaped construction of the shells 162 permitting this outward expansion and inward contraction without bell mouth distortion. Furthermore, if one brake drum tends to heat up faster and expand more rapidly than the other, its reduction in its share of the braking load throws this load upon the other brake drum, which consequently heats up and expands more rapidly, thereby evening up the expansion between the two brake drums. Moreover, the forms 200, 300 and 400 of the invention shown in FIGURES 2, 4 and 5 enable the respective outer and inner wheels to be strongly yet inexpensively constructed from stamped components, these stampings providing the wheel web and spokes in one piece and a reinforcing member in another piece and secured thereto by welding, either internally as in FIGURES 2 and 4 or externally as in FIGURE 5, thereby giving the effect of a solid tapered wheel web construction with a section modulus which is at its maximum near the wheel hub and which decreases toward the periphery of the wheel. It will also be observed that the spokes of the wheels in their various forms act as fan blades serving to circulate cooling air through the wheel webs between the ribs to the brake drums, thereby also providing a skeleton structure through which air circulates freely.

The still further modified differential dual wheel unit, generally designated 500, shown in FIGURES 9 to 14 inclusive, employs the same integral or one-piece cast construction as in FIGURE 1, for the outer wheel 22, hub assembly 25, bearing assemblies 28 and 30, and axle 26, hence no repetition of the description thereof is made, and the same reference numerals are used for corresponding parts. The inner wheel assembly, generally designated 502, of FIGURE 9 differs from the inner wheel assembly 24 of FIGURE 1 by being cast in a single piece rather than having a separate shell bolted thereto, like the shell 162 of FIGURE 1.

Figures 11, 12, 13, 14:
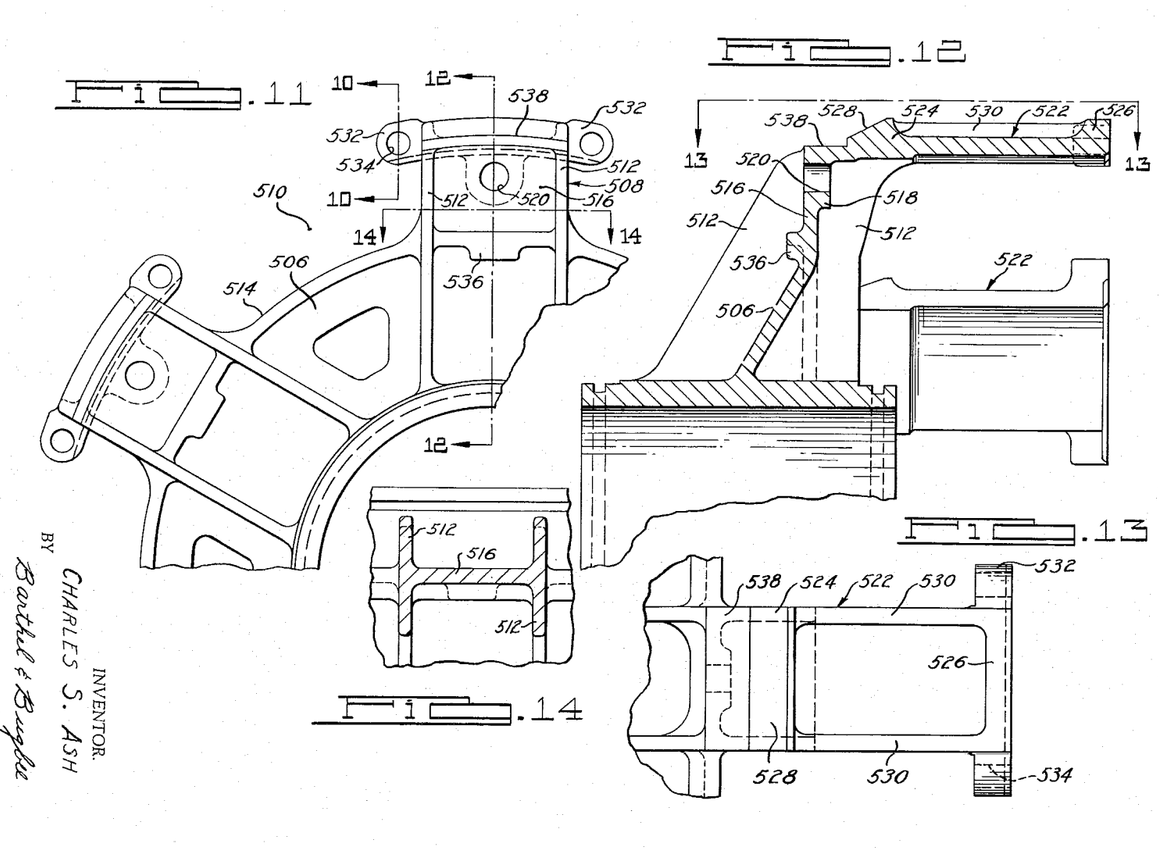
FIGURE 11 is a fragmentary front elevation of the inner wheel casting of FIGURE 9, removed from the dual wheel unit.
FIGURE 12 is a fragmentary vertical section taken along the line 12—12 in FIGURE 11.
FIGURE 13 is a fragmentary top plan view taken along the line 13—13 in FIGURE 12.
FIGURE 14 is a fragmentary horizontal section through one of the wheel spokes taken along the line 14—14 in FIGURE 11.

In particular, the outer or external hub 504 corresponding to the outer or external hub 38 of FIGURE 1 has an inner wheel web 506 integral with and inclined rearwardly from the external hub 504, with integral spokes 508 disposed at evenly-spaced intervals around the circumference with arcuate gaps of cutaway spaces 510 therebetween (FIGURE 11). The spokes 508 have circumferentially-spaced parallel ribs 512 extending from their peripheries to the external hub 504 (FIGURE 11) whereas the web 506 interconnecting the ribs 512 of the spokes 508 has a circumferential rib 514 extending therearound and likewise interconnecting the ribs 512 of the spokes 508. The ribs 512 extend axially both forwardly and rearwardly of the wheel web 506 and its rib extensions 516 extend circumferentially between the ribs 512 (FIGURES 12 and 14). The rib extensions 516 of the wheel web 506 (FIGURE 12) have bosses 518 cast integral therewith and provided with bolt holes 520.

Figures 9, 10:
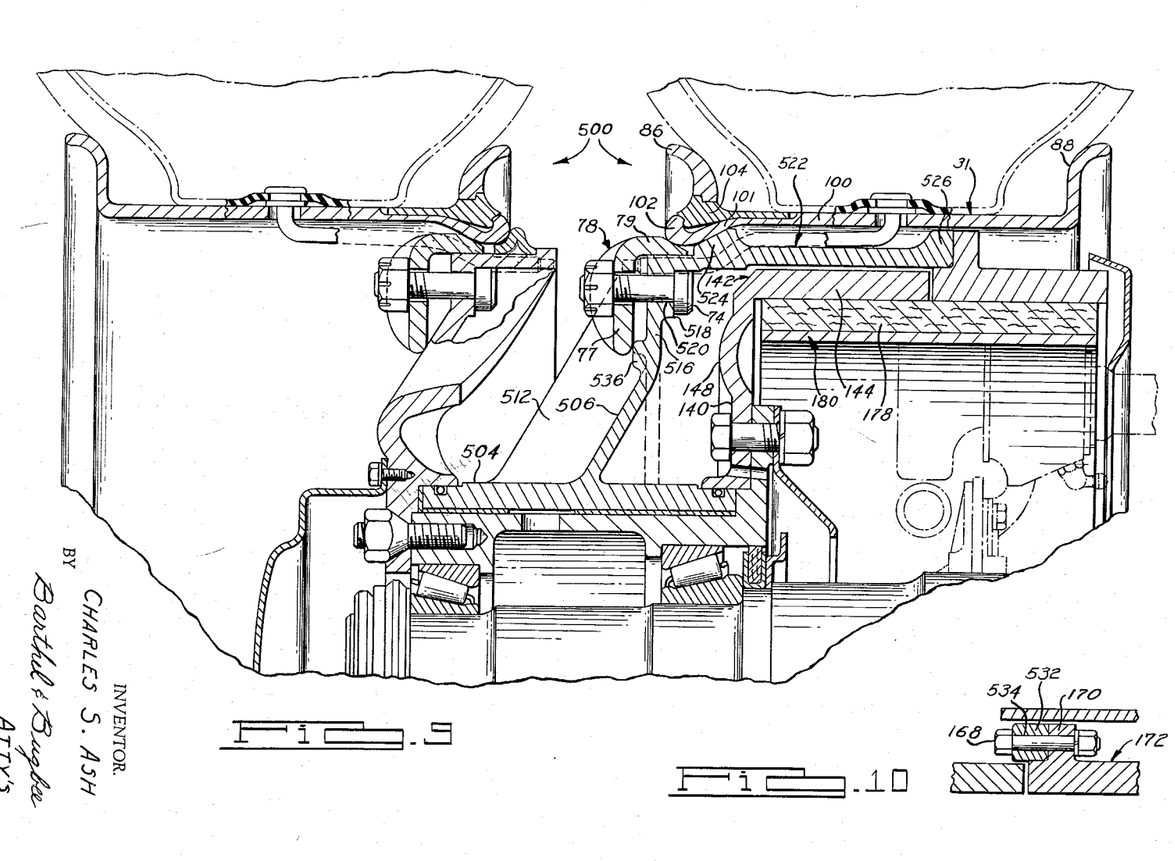
FIGURE 9 is a longitudinal radial section through approximately one-half of a still further modified differential dual wheel unit taken in a plane corresponding to the plane 12—12 in FIGURE 11, wherein both the outer and inner wheels are of integral cast construction, including the inner wheel structure connecting it to the inner brake drum.
FIGURE 10 is a fragmentary radial section through the inner brake drum and the adjacent connecting structure of the inner wheel, taken in a plane rotated slightly out of the vertical to one side of the section plane of FIGURE 9 and corresponding to the plane 10—10 in FIGURE 11, showing the bolted connection between the inner brake drum and such connecting structure.

Integral with the spokes 508 and extending axially rearward therefrom are bridge portions 522 (FIGURES 12 and 13) formed roughly in the shape of cylindrical segments spaced apart from one another at the same circumferential spacings as the spokes 508. The bridge portions 522 have forward and rearward raised ribs 524 and 526 respectively, the rib 524 having a conical or inclined surface 528 adapted to be engaged by the annularly-rounded edge portion 102 of the bottom 100 of the rim assembly 31. Integral axial ribs 530 extend longitudinally between the circumferential segmental ribs 524 and 526, the latter being provided with circumferentially-projecting ears 532 (FIGURES 11 and 13) with bolt holes 534 therethrough (FIGURE 10). The bolt holes 534 are aligned with corresponding bolt holes in the rib 170 of the inner brake drum 172 to receive the bolts 168.

The ribs 512 of the spokes 508 are interconnected intermediate their outer and inner ends by short portions of the circumferential ribs 514 (FIGURE 11) having central radial bosses 536 (FIGURES 9, 11 and 12) which serve as abutments for the radial portions 77 of the rim clamps 78, the axial portions 79 of which wedge themselves between the annularly-rounded edge portion 102 of the rim flange 101 and the segmental cylindrical surfaces 538 to hold the rim assembly 31 firmly and immovably in position, in a manner similar to that explained above in connection with the description of the dual wheel unit 20 of FIGURE 1. The rim clamps 78, as before, are also secured in position and given their wedging action by the rim clamping bolts 74 which in this modification pass through the holes 520 in the bosses 518. The outer brake drum 152 of FIGURE 9 is of the same construction and consequently bears the same reference numerals as that of FIGURE 1.

The operation of the differential dual wheel unit 500 is substantially the same as that described above in connection with the other forms of the invention shown in FIGURES 1 to 8 inclusive and hence require no repetition.

Figure 15:
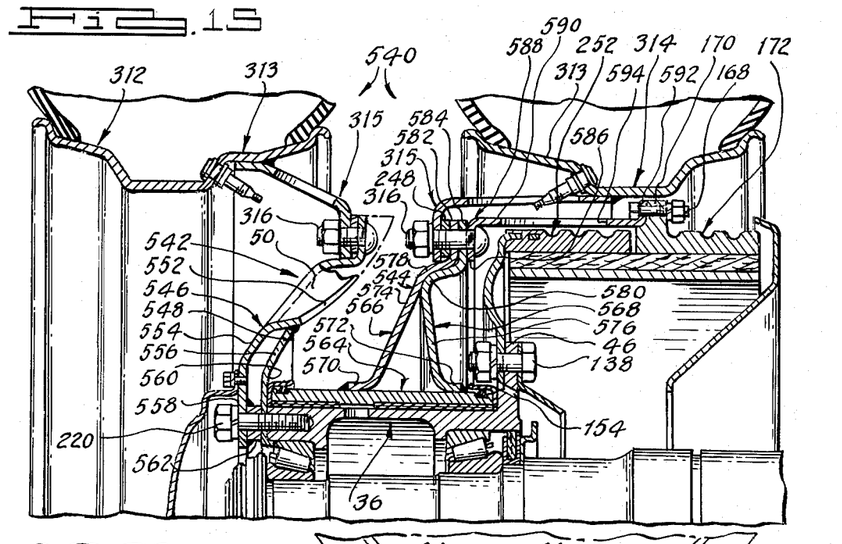
FIGURE 15 is a longitudinal radial section similar to FIGURE 2 but of a further modified construction wherein the wheels have increased section moduli and the inner wheel webs are welded to the external hub.

The further modified differential dual wheel unit, generally designated 540, shown in FIGURE 15 has outer and inner wheels, generally designated 542 and 544, respectively, which are fabricated or built up from sheet metal forming a wheel web 546 and a reinforcement member 548 of somewhat similar construction to the stamped outer wheel web 206 and reinforcement member 212 of FIGURES 2 and 4 and similarly provide radial spokes 550 separated by cutaway portions 552. The axle construction is also similar. The reinforcement member 548 is of annular form and is welded or otherwise secured at its periphery to the outer wheel web 546. The members 546 and 548 have inclined intermediate portions 554 and 556 respectively and radial central portions 558 and 560 respectively which, as in FIGURES 2 and 4, are bolted to the internal hub 36 but spaced apart from one another by an annular suitable drilled spacer 562 giving an increased section modulus to the outer wheel 542.

The remaining construction of the outer wheel 542 is similar to that of the outer wheel 308 and has a similar bolt-on rim adapter ring 315 secured as by welding to the tubeless tire rim 313 of the outer tubeless rim assembly 312 as shown in FIGURE 4, hence similar reference numerals are accordingly used for these parts in FIGURE 15. The inner rim assembly 314 of FIGURE 15 is also of the same construction as the similarly-numbered inner rim assembly 314 of FIGURE 4 and also consists of a tubeless tire rim 313 and rim adapter ring 315 secured thereto and bolted as at 316 to the inner wheel 544.

The inner wheel 544 has an external hub 564 generally similar to the external hub 38 of FIGURES 2 and 4 but is provided with a stamped wheel web 566 and a stamped reinforcement member 568 having central axial portions 570 and 572 welded or otherwise secured to the external hub 564 (FIGURE 15), oppositely-inclined intermediate portions 574 and 576 converging outwardly from said external hub 564 toward one another and abutting one another at rounded portions 578 and 580 extending rearwardly and terminating in radial portions 582 and 584 respectively suitably drilled to receive the bolts 316 which also pass through the drilled reinforcement plates 248 and through the rim adapter ring 315. The bolts 316 also pass through the inwardly-directed radial flange 586 of a generally cylindrical connecting member, generally designated 588, having a generally cylindrical axial portion 590 which at its rearward end is provided with an outwardly-directed radial flange 592. The latter is drilled at circumferentially-spaced intervals to receive the bolts 168 by which it is secured to the external rib 170 of the inner brake drum 172. Ventilation and lubricant-expelling holes 594 are provided at circumferentially-spaced intervals in the cylindrical portion 590. The construction of the outer brake drum 252 is also similar to the outer brake drum 252 of FIGURE 2 and is similarly secured by the bolts 138 to the internal hub 36, hence requires no additional description. Holes 154 are also provided at intervals through the radial bolt-on flange 46 for the passage of lubricant outward, as explained in connection with FIGURE 2. The operation of the differential dual wheel unit 540 is also substantially the same as that described above in connection with FIGURES 1 to 8 inclusive and hence also requires no repetition.

Figures 16, 17:
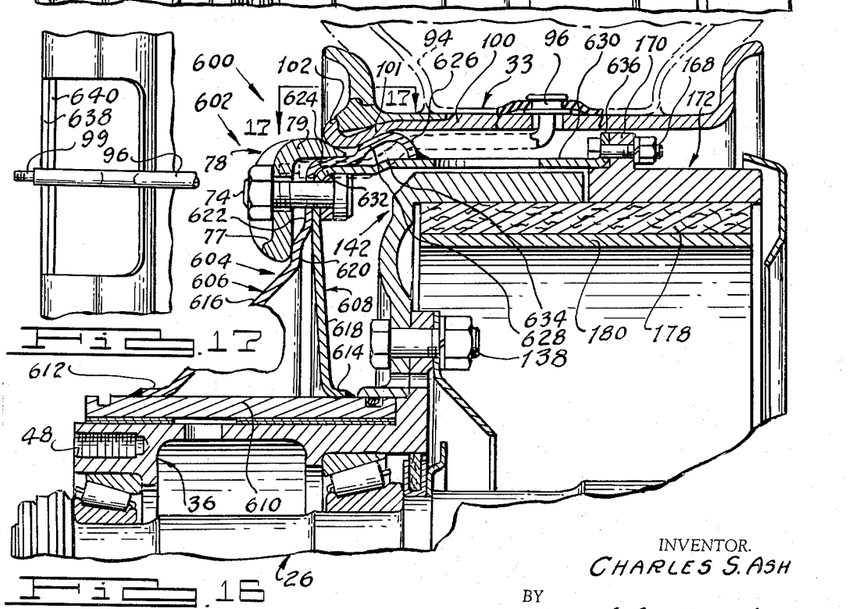
FIGURE 16 is a longitudinal radial section through a still further modified inner wheel construction wherein the approximately cylindrical coupling member bolted to the inner brake drum is integral with the inner stamping of the inner wheel, the outer wheel being similar to that of FIGURE 15.
FIGURE 17 is a fragmentary top plan view of the peripheral portion of the outer stamping of the inner wheel of FIGURE 16, looking in the direction of the line 17—17 in FIGURE 16, with the tire rim and clamping lugs removed.

The differential dual wheel unit, generally designated 600, shown in FIGURES 16 and 17 omits the outer wheel unit, because this is the same as that shown at 202 in FIGURE 2 and similarly bolted to the internal hub 36 by bolts threaded into the bolt holes 48. The axle and bearing construction is also the same as that previously described in connection with FIGURE 1. The inner wheel assembly, generally designated 602, is of the tube tire type and includes an inner wheel, generally designated 604, combined with a rim assembly 33 identical with that shown in FIGURE 1 and described in connection therewith as well as employing the same rim clamps 78 and clamping bolts 74. The outer and inner brake drums 142 and 172 are also similar to those bearing the same reference numerals as in FIGURE 1 and the inner brake drum 142 is similarly bolted to the internal hub 36 as at 138.

The inner wheel 604 of the inner wheel assembly 602, similarly to the corresponding structure of FIGURE 15, has a web member 606 and a reinforcement member 608 both inclined oppositely to the external hub 610 and having oppositely-extending attachment flanges 612 and 614 (FIGURE 16) secured as by welding to the external hub 610 which, as before, is of hollow cylindrical form. The outer and inner members 606 and 608 have inclined or approximately conical intermediate portions 616 and 618, the former having an approximately radial abutment portion 620 engaged by the radial portions 77 of the rim clamps 78 with a rearwardly-offset radial portion 622 bent axially as at 624 to receive the axial portions 79 of the rim clamps 78, an annular hump or hollow annular rib 626 with an inclined conical seat 628 being provided to receive the inclined portion 101 of the rim bottom 100, the rounded portion 102 of which is engaged by the rim clamp portions 79 in wedging relationship. The reinforcement member 608 has an integral brake drum attachment portion 630 joined to the approximately radial portion 618 at a bend 632, the portion 630 being provided with an outwardly-inclined portion 634 adjacent the place of engagement of the edge of the hollow annular rib 626 with the integral brake drum attachment portion 630, the ribs 626 and the portion 630 being secured to one another as by welding. The brake drum attachment portion 630 at its rearward end is provided with an outwardly-directed radial flange 636 which is suitably drilled at intervals in alignment with the similarly-drilled annular rib 170 of the inner brake drum 172 to receive the bolts 168 securing the two to one another. The humped portion or annular hollow rib 626 and the part of the brake drum attachment portion 630 adjacent the bend 632 are provided with aligned circumferentially-elongated apertures 638 and 640 respectively (FIGURE 17) for passage of and access to the inflation stem 96 of the tire tube 94. The stem 96 at its outer end is reduced in diameter and threaded as at 99 to receive the usual cap, and internally-threaded (not shown) to receive the usual valve core.

The operation of the differential dual wheel unit 600 is likewise similar to that described above in connection with FIGURES 1 to 8 inclusive and accordingly requires no repetition.

Figure 18:
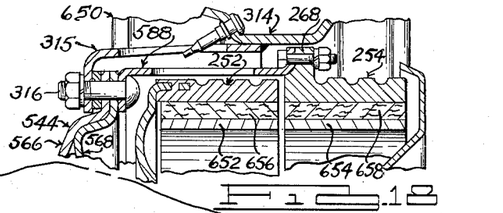
FIGURE 18 is a fragmentary longitudinal radial section through a modification of FIGURE 15, providing a separate brake band and lining for each brake drum.

The additionally modified differential dual wheel construction, generally designated 650 (FIGURE 18) of which only the portion adjacent the inner wheel is shown, provides individual brake shoes 652 and 654 and individual brake linings 656 and 658 respectively secured thereto instead of the common brake lining and brake shoe spanning the various outer and inner brake drums, such as, for example, the outer and inner brake drums 142 and 172 (FIGURE 1), or 252 and 254 (FIGURE 2). Conventional actuating mechanism (not shown) is provided for moving the individual brake shoes 652 and 654 and their linings 656 and 658 into engagement with their respective outer and inner brake drums. The remainder of the mechanism and structure shown in FIGURE 18 is identical with that shown in FIGURE 15, of which FIGURE 18 shoes the portion thereof in the upper right-hand corner of FIGURE 15, hence the same reference numerals are used to designate corresponding parts.

The operation of the differential dual wheel construction 650 is similar to that described above in connection with the other forms of the invention, with the exception of the fact that when the conventional brake-operating mechanism is actuated, the individual brake shoes 652 and 654 and their respective brake linings 656 and 658 are moved independently into and out of engagement with their respective outer and inner brake drums 142 and 172 or 252 and 254.

What I claim is:

1. A differential dual wheel construction for a vehicle axle, comprising an internal hub, internal bearing means disposed within said internal hub and adapted to rotatably support said internal hub, an external hub disposed in radially-spaced coaxial relationship with said internal hub, external bearing means disposed between said internal hub and said external hub for rotatably supporting said external hub upon said internal hub, an outer wheel drivingly connected to said internal hub for rotation therewith, an inner wheel drivingly connected to said external hub for rotation therewith, an outer tire rim connected to said outer wheel, an inner tire rim connected to said inner wheel, outer and inner brake drums disposed side-by-side coaxial with said hubs, means coupling said outer brake drum to one of said hubs, means including a portion of said inner wheel, extending into proximity to said inner brake drum for coupling said inner brake drum to the other of said hubs, and a braking structure mounted adjacent said brake drums for motion into and out of frictional braking engagement with said brake drums.

2. A differential dual wheel construction, according to claim 1, wherein means is provided for detachably securing said tire rims to said wheels, said securing means including wedging clamps disposed between said rims and their respective wheels and fasteners operatively engaging said clamps.

3. A differential dual wheel construction, according to claim 1, wherein the outer brake drum coupling means includes a projection on said outer brake drum and a cooperating flange on said internal hub and fasteners securing said outer brake drum projection to said hub flange, said outer brake drum projection having an annular convexo-concave bulge therein extending substantially from said outer brake drum to said internal hub flange.

4. A differential dual wheel construction, according to claim 1, wherein the internal hub has a hardened external surface and annular sealing elements are disposed between said internal hub and the opposite ends of said external hub.

5. A differential dual wheel construction, according to claim 1, wherein one of said wheels has a web of substantially uniform thickness and also has a reinforcing member extending from its respective hub to a junction with said web at a location spaced radially apart from said respective hub.

6. A differential dual wheel construction, according to claim 5, wherein said reinforcing member is disposed behind said web.

7. A differential dual wheel construction, according to claim 5, wherein said reinforcing member is disposed in front of said web.

8. A differential dual wheel construction for a vehicle axle, comprising an internal hub, internal bearing means disposed within said internal hub and adapted to rotatably support said internal hub, an external hub disposed in radially-spaced coaxial relationship with said internal hub, external bearing means disposed between said internal hub and said external hub for rotatably supporting said external hub upon said internal hub, an outer wheel drivingly connected to said internal hub for rotation therewith, an inner wheel drivingly connected to said external hub for rotation therewith, an outer tire rim connected to said outer wheel, an inner tire rim connected to said inner wheel, outer and inner brake drums disposed side-by-side coaxial with said hubs, means coupling said outer brake drum to one of said hubs, means including a portion of said inner wheel extending into proximity to said inner brake drum coupling said inner brake drum to the other of said hubs, means for detachably securing said tire rims to said wheels, said securing means including an annular adapter connected to each rim and extending adjacent the periphery of its respective wheel, said securing means also including fasteners detachably securing each adapter to its respective wheel, and a braking structure mounted adjacent said brake drums for motion into and out of frictional braking engagement with said brake drums.

9. A differential dual wheel construction, according to claim 8, wherein the adapter includes circumferentially-spaced radially-disposed lugs extending adjacent the periphery of its respective wheel and wherein the fasteners secure said lugs to said respective wheel.

10. A differential dual wheel construction, according to claim 9, wherein the wheels have circumferentially-spaced radial spokes having seats thereon snugly receiving said lugs.

11. A differential dual wheel construction, according to claim 1, wherein said inner wheel has a web integral with said extending hub.

12. A differential dual wheel construction, according to claim 1, wherein said inner wheel has a web integral with said external hub and wherein said inner brake drum coupling means includes an axially-directed coupling structure integral with said inner wheel web and extending rearwardly from the periphery thereof into coupled engagement with said iner brake drum.

13. A differential dual wheel construction, according to claim 1, wherein said inner wheel has a web integral with said external hub and circumferentially-spaced radial spokes integral with said inner wheel web, and wherein said inner brake drum coupling means includes axially-directed coupling members integral with said spokes and extending rearwardly from the outer ends thereof into coupled engagement with said inner brake drum.

14. A differential dual wheel construction, according to claim 12, wherein said coupling structure also has tire-rim-engaging seats thereon.

15. A differential dual wheel construction, according to claim 13, wherein said coupling members have tire-rim-engaging seats thereon.

16. A differential dual wheel construction, according to claim 1, wherein one of said wheels has a web of substantially uniform thickness and also has a reinforcing member with its central portion spaced axially away from the central portion of said web and extending from its respective hub to a junction with said web spaced radially outward from said respective hub.

17. A differential dual wheel construction, according to claim 5, wherein said coupling means includes an axially-directed coupling structure integral with said reinforcing member and extending rearwardly from the periphery thereof into coupled engagement with said inner brake drum.

18. A differential dual wheel construction, according to claim 1, wherein said braking structure includes, brake lining means extending across both of said brake drums.

References Cited in the file of this patent

UNITED STATES PATENTS

| | | |
|---|---|---|
| 2,129,199 | Dake | Sept. 6, 1938 |
| 2,303,599 | Ash | Dec. 1, 1942 |
| 2,387,382 | Ash | Oct. 23, 1945 |
| 2,482,824 | Alden | Sept. 24, 1949 |
| 2,536,119 | Ash | Jan. 2, 1951 |